US009225780B2

(12) United States Patent
Braam et al.

(10) Patent No.: US 9,225,780 B2
(45) Date of Patent: Dec. 29, 2015

(54) DATA INTEGRITY IN A NETWORKED STORAGE SYSTEM

(75) Inventors: Peter J. Braam, Nederland, CO (US); Nathaniel Rutman, Portland, OR (US)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 13/404,618

(22) Filed: Feb. 24, 2012

(65) Prior Publication Data

US 2013/0226887 A1      Aug. 29, 2013

(51) Int. Cl.
| G06F 11/08 | (2006.01) |
| G06F 11/00 | (2006.01) |
| G06F 17/30 | (2006.01) |
| H04L 29/08 | (2006.01) |
| G06F 11/10 | (2006.01) |
| G06F 3/06 | (2006.01) |

(52) U.S. Cl.
CPC ............ *H04L 67/1097* (2013.01); *G06F 3/067* (2013.01); *G06F 3/0619* (2013.01); *G06F 11/1004* (2013.01); *G06F 17/30203* (2013.01)

(58) Field of Classification Search
None
See application file for complete search history.

(56) References Cited

U.S. PATENT DOCUMENTS

| 6,931,576 | B2 * | 8/2005 | Morrison et al. ............... 714/54 |
| 6,964,008 | B1 * | 11/2005 | Van Meter, III ............. 714/807 |
| 2008/0307122 | A1 * | 12/2008 | Butler et al. .................... 710/23 |
| 2011/0029847 | A1 * | 2/2011 | Goldenberg et al. ......... 714/801 |
| 2011/0283085 | A1 * | 11/2011 | Dilger et al. ................... 711/216 |

OTHER PUBLICATIONS

Holt, Keith; "End-to-End Data Protection Justification"; T10 Technical Committee document # T10/03-224r0; Jul. 1, 2003; p. 1.*
Dilger et al.; "End to End Data Integrity Design"; Jun. 15, 2009; Sun Microsystems.*

* cited by examiner

*Primary Examiner* — Alex Gofman
*Assistant Examiner* — Umar Mian
(74) *Attorney, Agent, or Firm* — Hall Estill Attorneys at Law

(57) ABSTRACT

A method of writing data to a distributed file system including a file system client, a server and a storage resource target, includes generating, on the client, a write request including a byte stream to be written to the storage resource target; formatting, on the client, the byte stream into sectors in accordance with the T10 protocol, the sectors including a data field and a protection information field, the protection information field including a guard field, an application field and a reference field; computing, on the client, checksum data for the guard field; sending, across a network, the data and the protection information to the server; verifying, in T10-capable hardware on the server, the checksum data for the guard field; verifying, on the storage resource target, the checksum data for the guard field; and storing the data on the storage resource target.

20 Claims, 8 Drawing Sheets

DATA INTEGRITY IN A NETWORKED STORAGE SYSTEM

BACKGROUND OF THE INVENTION

1. Field

The primary field of use for the present method and apparatus is in the field of networked storage systems. Such systems may, non-exhaustively, comprise distributed file systems, cloud networks, remote storage or other network-addressable storage arrangements. The present invention relates, more specifically, to a method of, and apparatus for, end to end data integrity. In particular, the present invention relates to a method of, and apparatus for, end to end data integrity using the T10 protocol.

2. Description of Related Art

Data integrity is a core requirement for a reliable storage system. The ability to prevent and, if necessary, identify and correct data errors and corruptions is essential for operation of storage systems ranging from a simple hard disk drive up to large mainframe storage arrays.

A typical hard disk drive comprises a number of addressable units, known as sectors. A sector is the smallest externally addressable portion of a hard disk drive. Each sector typically comprises 512 bytes of usable data. However, recent developments under the general term "advanced format" sectors enable support of sector sizes up to 4 k bytes. When data is written to a hard disk drive, it is usually written as a block of data, which comprises a plurality of contiguous sectors.

A hard disk drive is an electro-mechanical device which may be prone to errors and or damage. Therefore, it is important to detect and correct errors which occur on the hard disk drive during use. Commonly, hard disk drives set aside a portion of the available storage in each sector for the storage of error correcting codes (ECCs). This data is also known as protection information. The ECC can be used to detect corrupted or damaged data and, in many cases, such errors are recoverable through use of the ECC. However, for many cases such as enterprise storage architectures, the risks of such errors occurring are required to be reduced further.

One approach to improve the reliability of a hard disk drive storage system is to employ redundant arrays of inexpensive disk (RAID). Indeed, RAID arrays are the primary storage architecture for large, networked computer storage systems.

The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each architecture offers disk fault-tolerance and offers different trade-offs in terms of features and performance. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). The implementation of mirroring in RAID 1 architectures involves creating an identical image of the data on a primary disk on a secondary disk. RAID 3, 4, 5, or 6 architectures generally utilise three or more disks of identical capacity. In these architectures, two or more of the disks are utilised for reading/writing of data and one or more of the disks store parity information. Data interleaving across the disks is usually in the form of data "striping" in which the data to be stored is broken down into blocks called "stripe units". The "stripe units" are then distributed across the disks.

Therefore, should one of the disks in a RAID group fail or become corrupted, the missing data can be recreated from the data on the other disks. The data may be reconstructed through the use of the redundant "stripe units" stored on the remaining disks. However, RAID architectures utilising parity configurations need to generate and write parity information during a write operation. This may reduce the performance of the system.

For a system with local storage, the American National Standards Institute's (ANSI) T10-DIF (Data Integrity Field) specification format enables data protection. The T10-DIF format specifies data to be written in blocks or sectors of 520 bytes. This is shown schematically in FIG. 7. The 8 additional bytes in the data integrity field provide additional protection information (PI), some of which comprises a checksum that is stored on the storage device together with the data. The data integrity field is checked on every read and/or write of each sector to verify data integrity between system memory and a host bus adapter (HBA). This enables detection and identification of data corruption or errors. T10-DIF is hardware-based, where an I/O controller adds the protection information (PI) that is then verified by the storage device hardware. Therefore, T10-DIF is only suitable for localised hardware because it cannot protect across a network.

ANSI T10-DIF provides three types of data protection: logical block guard (GRD) for comparing the actual data written to disk, a logical block application tag (APP) and a logical block reference tag (REF) to ensure writing to the correct virtual block. The logical block application tag is not reserved for a specific purpose.

In general, the operation of T10-DIF in a local storage system is shown in FIG. 7. A byte stream is generated by a client application. This is then formatted by an Operating System (OS) into a byte sector of 512 bytes. The I/O controller (or host bus adapter) then appends 8-bit PI to the 512 byte sector to form a 520 byte sector. This is then sent via a storage area network (SAN) to the RAID array and eventually to the disk drive where the data is written as a 520 byte sector. The PI is checked at each of these stages.

A further extension to the T10-DIF format is the T-10 DIX (data integrity extension) format which enables 8 bytes of extension information to enable PI potentially to be piped from the client application directly to the storage device.

This process is illustrated in FIG. 8. The same data format of 520 byte sector is used in T10-DIX as for T10-DIF. However, in this instance, 8 bytes of PI is generated by the user application or OS along with the 512 byte sector. The 8 byte PI is then checked at every stage in the transfer of data to the storage disk drive.

Data protection measures such as RAID, T10-DIF and T10-DIX are useful to prevent data corruption and errors occurring locally on a storage system. However, storage solutions are now generally accessible across networks. For example, distributed file systems are now common. A distributed file system (or network file system) is a file system that allows access to files from multiple hosts (or clients) sharing via a network such as an Ethernet or the internet. This makes it possible for multiple users on multiple machines to share files and storage resources. The most common arrangement is a client-server architecture in which the server provides a service to requesting hosts.

A commonly used distributed file system is Lustre™. Lustre is a parallel distributed file system, generally used for large scale cluster computing. Lustre file systems are scalable and are able to support many thousands of clients and multiple servers. A Lustre file system generally comprises three units: a metadata server (MDS), one or more object storage servers (OSSs) and one or more clients which access the OSSs.

The MDS generally comprises a single metadata target (MDT) per file system that is operable to store metadata such as filenames, directories, access permissions, and file layout. The MDT data is generally stored in a single local disk file system.

The OSSs store file data on one or more object storage targets (OSTs). Each OST manages a single local disk file system. Lustre presents all clients with a unified namespace for all of the files and data in the file system and allows read and write access to the files in the file system.

One of the challenges of a distributed file system such as Lustre is to provide efficient end-to-end data integrity. Therefore, mechanisms are required to ensure that data sent by a client node (e.g. client computer or application) is stored on a respective OST correctly. In other words, it is desirable for data written by a client application to be verified as correctly saved on a storage device. This is not possible using techniques such as RAID, T10-DIF and T10-DIX. This is because these techniques act locally on a server whereas in a network file system data corruption may occur at other locations, for example on the client or across the network before the data arrive at the server.

In order to address this issue, many Lustre systems use an I/O checksum which provides "over-the-wire" verification. The Lustre checksum uses a CRC-32 algorithm to detect single bit errors and swapped and/or missing bytes. A Lustre network checksum is generally provided per 1 MB client remote procedure call (RPC). However, other checksum algorithms may also be used; for example, Adler32 or CRC-32c.

However, whilst the Lustre checksum is able to provide "over-the-wire" verification of data, these checksums are only able to provide protection over a network. They cannot provide protection locally on a server. In addition, the Lustre checksum algorithm requires a significant amount of computational resources on the server side to execute the necessary checksums. This is particularly an issue since the number of checksums to be calculated scales with the number of clients, and there are generally considerably more clients (and therefore considerably more RPCs to execute) than there are servers. Consequently, storage system performance can be affected if the OSS and MDS server hardware is not powerful enough to handle both the I/O, file system administration and checksum services concurrently.

Therefore, in summary, the existing T10 DIF format is operable to provide data integrity locally. In addition, the network checksum can only provide data integrity over the wire. Neither of these approaches can provide data integrity on the client itself, let alone complete end to end data integrity. Furthermore, T10 DIF and network checksums are not linked together in any way, increasing complexity and computational loads on the servers.

Consequently, to date, known storage systems suffer from a technical problem that end to end data integrity cannot be achieved reliably on existing storage systems and without placing high demand on server resources.

SUMMARY

According to a first aspect of the present invention, there is provided a method of writing data to a distributed file system comprising at least one file system client, at least one server and at least one storage resource target, the method comprising: a) generating, on said client, a write request comprising a byte stream to be written to said storage resource target; b) formatting, on said client, said byte stream into sectors in accordance with the T10 protocol, the sectors comprising a data field and a protection information field, the protection information field comprising a guard field, an application field and a reference field; c) computing, on said client, checksum data for said guard field; d) sending, across a network, said data and said protection information to said server; e) verifying, in T10-capable hardware on said server, said checksum data for said guard field; and f) verifying, on said storage resource target, said checksum data for said guard field; and g) storing said data on said storage resource target.

In one embodiment, step b) further comprises formatting said byte stream into sectors comprising 512 bytes of data and 8 bytes of protection information in accordance with the T10 protocol.

In one embodiment, prior to step d), the method further comprises: h) said data and protection information is formatted into an RPC format.

In one embodiment, said RPC buffer is 1 MB in size.

In one embodiment, step e) is performed by a host bus adapter.

In one embodiment, the host bus adapter is T10-DIF or T10-DIX compliant.

In one embodiment, after step c), the method further comprises: i) writing said checksum data to the client kernel; and j) recomputing said checksum data for said guard field.

In one embodiment, steps a) to c) are carried out by a client application or operating system.

According to a second aspect of the present invention, there is provided a method of reading data from a distributed file system comprising at least one client, at least one server and at least one storage resource target, the method comprising: a) executing, from said client, a read request for reading of data from at least one data sector, the or each data sector being in accordance with the T10 protocol and comprising a data field and a protection information field, the protection information field comprising a guard field comprising checksum data, an application field and a reference field; b) verifying, on said storage resource target, the protection information associated with the requested sector or sectors; c) verifying, in T10-capable hardware on said server, the checksum data in said guard field; d) sending, across a network, said data and said protection information to said client; e) verifying, on said client, said checksum data in said guard field; and f) if said steps of verification are successful, reading the data from the or each data sector.

In one embodiment, step b) further comprises formatting said byte stream into sectors comprising 512 bytes of data and 8 bytes of protection information in accordance with the T10 protocol.

In one embodiment, in step d), the method further comprises: h) sending said data and protection information in a RPC format.

In one embodiment, said RPC buffer is 1 MB in size.

In one embodiment, step c) is performed by a host bus adapter.

In one embodiment, the host bus adapter is T10-DIF or T10-DIX compliant,

In one embodiment, steps e) to g) are carried out by a client application or operating system.

According to a third aspect of the present invention, there is provided a distributed file system comprising at least one client, at least one server and at least one storage resource target, the distributed file system being configured to carry out the steps of the first or second aspects.

According to a fourth aspect of the present invention, there is provided a computer program product executable by a programmable processing apparatus, comprising one or more software portions for performing the steps of the first and/or second aspects.

According to a fifth aspect of the present invention, there is provided a computer usable storage medium having a computer program product according to the fourth aspect stored thereon.

BRIEF DESCRIPTION OF THE DRAWINGS

Embodiments of the present invention will now be described in detail with reference to the accompanying drawings, in which.

DETAILED DESCRIPTION

Figure 1:
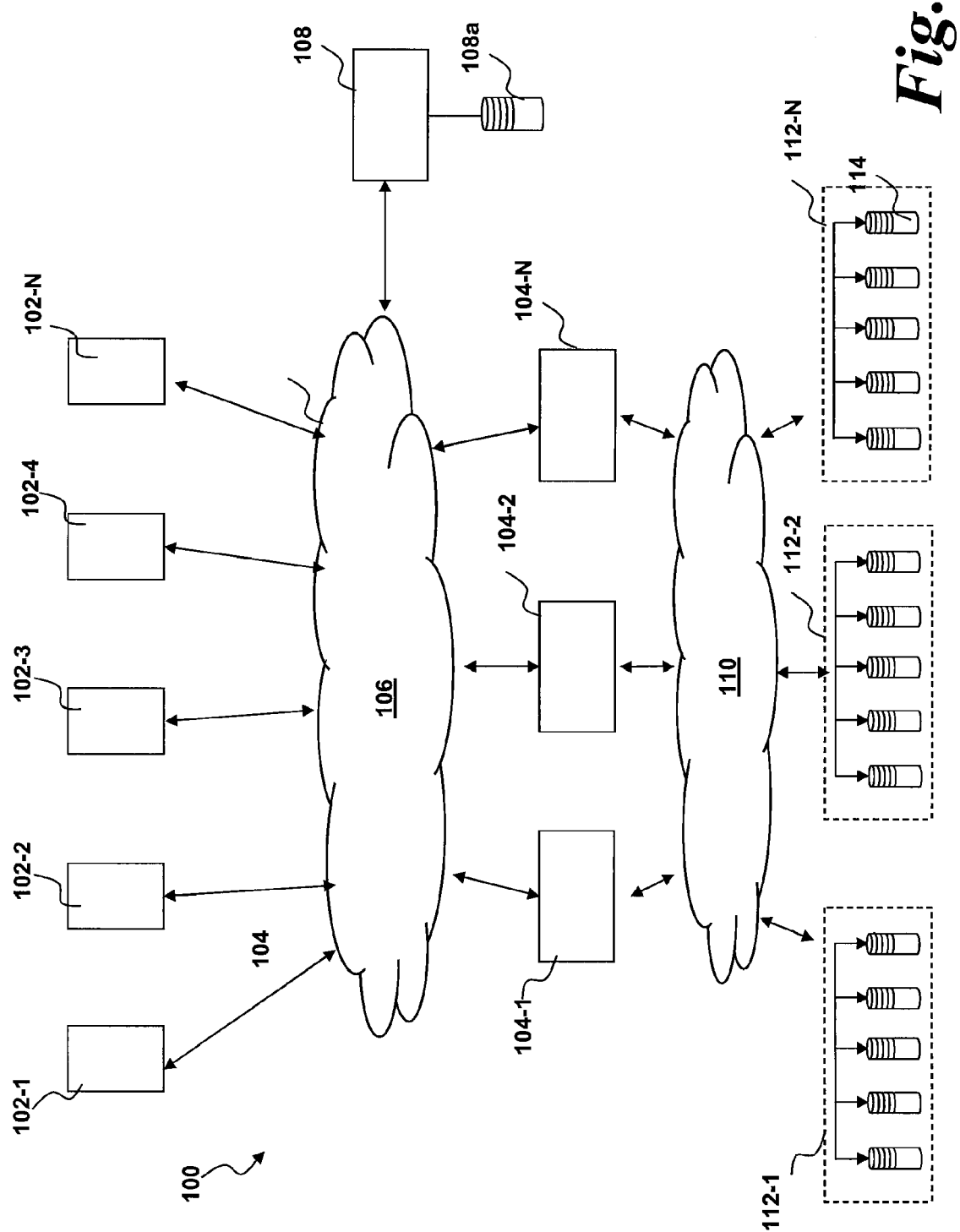
FIG. 1 is a schematic diagram of a distributed networked storage resource.

FIG. 1 shows a schematic illustration of a networked storage resource 100 in which the present invention may be used. The present invention is illustrated with respect to a parallel distributed file system. However, it is to be appreciated that such a networked storage resource is only one possible implementation of a storage resource which may be used with the present invention.

The present invention is directed to a networked file system in which the T10-DIF and T10-DIX data integrity protocols can be extended to achieve end-to-end data integrity across the network from host application to storage device.

The networked storage resource 100 comprises a distributed file system. A distributed file system consists of client 102-1 to 102-N and servers 104-1 to 104-N nodes, connected by a network 106. The servers 104 take the form of OSSes. Client applications, running on client nodes, make storage requests (which may comprise file storage requests) against the distributed file system. Some of these calls result in updates to the file system state.

The distributed networked storage resource comprises a plurality of hosts 102. The hosts 102 are representative of any computer systems or terminals that are operable to communicate over a network. Any number of hosts 102 or servers 104 may be provided; N hosts 102 and N servers 104 are shown in FIG. 1, where N is an integer value.

The hosts 102 are connected to a first communication network 106 which couples the hosts 102 to a plurality of servers 104. A metadata server (MDS) 108 is also connected to the network 106. The MDS 108 comprises local storage 108a.

The communication network 106 may take any suitable form, and may comprise any form of electronic network that uses a communication protocol; for example, a local network such as a LAN or Ethernet, or any other suitable network such as a mobile network or the internet.

The servers 104 are connected through device ports (not shown) to a second communication network 110, which is also connected to a plurality of OSTs 112-1 to 112-N in the form of RAID arrays of storage devices 114. The second communication network 110 may comprise any suitable type of storage controller network which is able to connect the servers 104 to the storage devices 114. The second communication network 110 may take the form of, for example, a SCSI network, an iSCSI network or fibre channel.

The servers 104 may comprise any storage controller devices that process commands from the hosts 102 and, based on those commands, control the storage devices 114. The storage devices 114 may take any suitable form; for example, tape drives, disk drives, non-volatile memory, or solid state devices.

Although most RAID architectures use hard disk drives as the main storage devices, it will be clear to the person skilled in the art that the embodiments described herein apply to any type of suitable storage device. More than one drive may form a storage device 114; for example, a RAID array of drives may form a single storage device 114. The skilled person will be readily aware that the above features of the present embodiment could be implemented in a variety of suitable configurations and arrangements. Additionally, each OST 112 comprising a RAID array of devices 114 appears to the hosts 102 as a single logical storage unit (LSU) or drive. Any number of OSTs 112 may be provided; in FIG. 1, N OSTs 112 are shown, where N is any integer value.

As an alternative variation, a RAID array of drives is not necessarily required. Alternatively, a single T10-DIF disk drive could function as an OST. Similarly, parity-declustered RAID (PDRAID) devices could be used, including network-striped PDRAID. The skilled person would be readily aware of variations which fall within the scope of the present invention.

The operation of the servers 104 may be set at the Application Programming Interface (API) level. Typically, Original Equipment Manufacturers (OEMs) provide RAID networks to end clients for network storage. OEMs generally customise a RAID network and tune the network performance through an API.

The servers 104 and OSTs 112 also provide data redundancy. The storage devices 114 comprise RAID controllers (described with reference to FIG. 2) which provide data integrity through a built-in redundancy which includes data mirroring. The storage devices 114 are arranged such that, should one of the drives in a group forming a RAID array fail or become corrupted, the missing data can be recreated from the data on the other drives.

Figure 2:
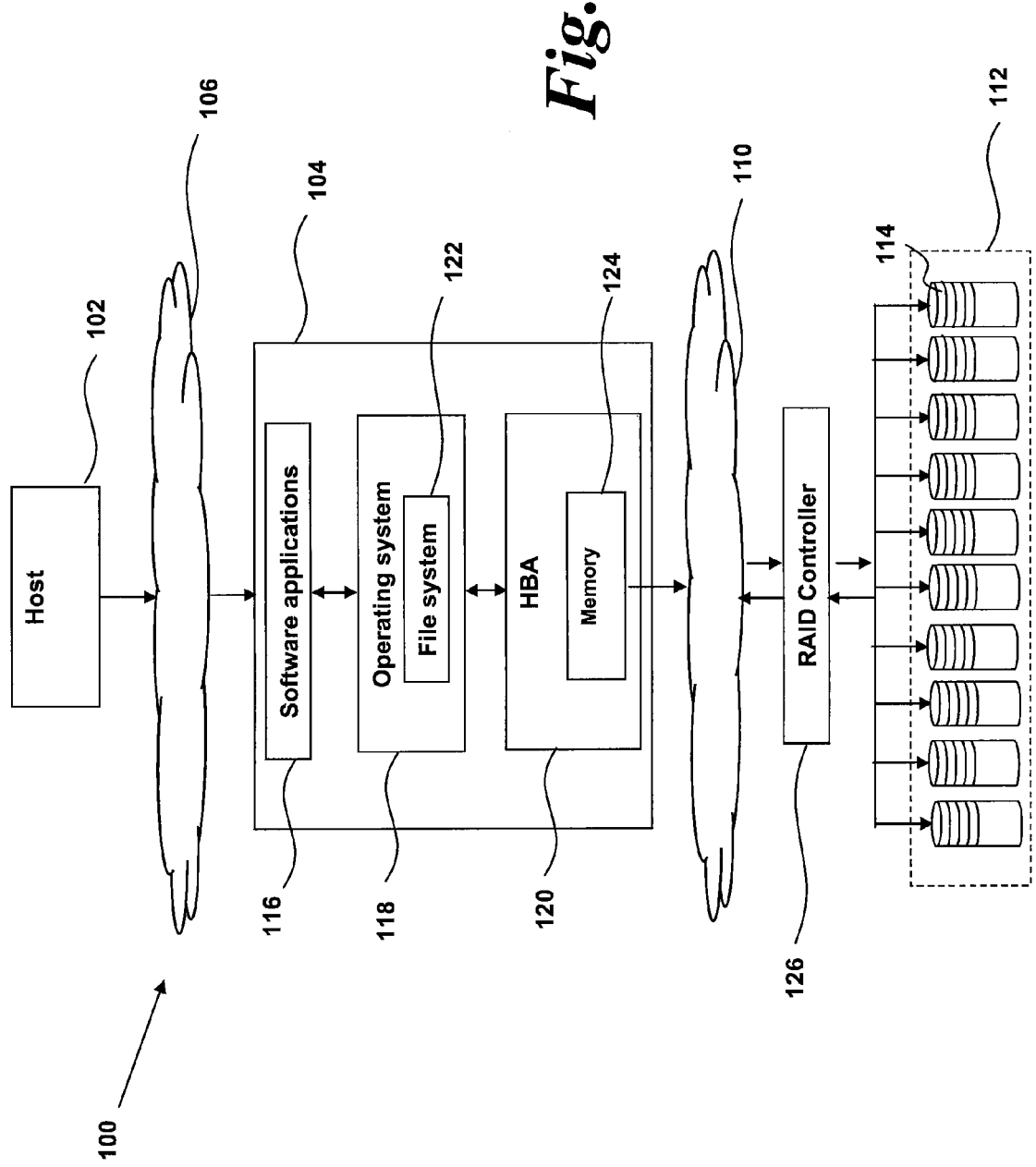
FIG. 2 is a schematic diagram showing a server of an embodiment of the present invention forming part of the distributed networked storage resource of FIG. 1.

FIG. 2 shows a more detailed schematic diagram of a single host 102, single server 104 and single OST 112 which may form the whole or part of the networked storage resource 100.

The host 102 comprises a general purpose computer (PC) which is operated by a client and which has access to the storage resource 100. The OSS 104 comprises a software application layer 116, an operating system 118 and a host bus adapter (HBA) 120.

The software application layer 116 comprises software applications including the algorithms and logic necessary for the initialisation and run-time operation of the server 104. The software application layer 116 includes software functional blocks such as a system manager for fault management, task scheduling and power management. The software application layer 116 also receives commands from the host 102 (e.g., assigning new volumes, read/write commands) and executes those commands. Commands that cannot be processed (because of lack of space available, for example) are returned as error messages to the client of the host 102.

The operating system 118 utilises an industry-standard software platform such as, for example, Linux, upon which the software applications forming part of the software application layer 116 can run. The operating system 118 comprises a Lustre file system 122 which enables the HBA 120 to store and transfer files to the OST 112 via a RAID controller 126.

The HBA 120 is the physical hardware interface between the RAID controller 126 and the server 104 that executes the software applications in the software application layer 116. The HBA 120 comprises a microprocessor, memory 124, and all other electronic devices necessary for I/O control with the RAID controller 126 operable to control the storage devices 114 of the OST 112. In this embodiment, the HBA 120 comprises the hardware necessary to utilise the T10 protocol, i.e the HBA 120 is configured to process the necessary checksums for data verification for each 520 byte sector as will be described below.

The HBA 120 may take any suitable format. However, it is required that the HBA 120 has T10-DIX type 1 or 2 support which provides for checking of the GRD and REF fields of each sector.

Whilst, in FIG. 2, the HBA 120 is shown as part of the server 104, this need not be so. The skilled person would be readily aware of alternatives which fall within the scope of the present invention; for example, the HBA 120 may be remote from the server 104.

The server 104 is operable to receive storage requests (which may comprise I/O requests) to the Lustre file system 122 from hosts or clients 102 and process said storage requests to the file system 122. The Lustre file system 122 may comprise any suitable variant of the system and may be run on the server 104 to provide access to the storage devices 112. Non-exhaustive examples of suitable file systems may be: NTFS, HFS, ext3 or ext4.

The Lustre file system 122 enables the storage on the OST 112 to be externally visible to the clients 102. Clients reference file offsets and ranges (or "extents") presented by the file system. In order to do so, file system structures on the MDS 108 comprise tables related to device space management. Such table information includes, for each file on the OST 112, a set of device block numbers identifying blocks where file data is stored and a list of a set of free blocks which do not hold file data.

Figure 3:
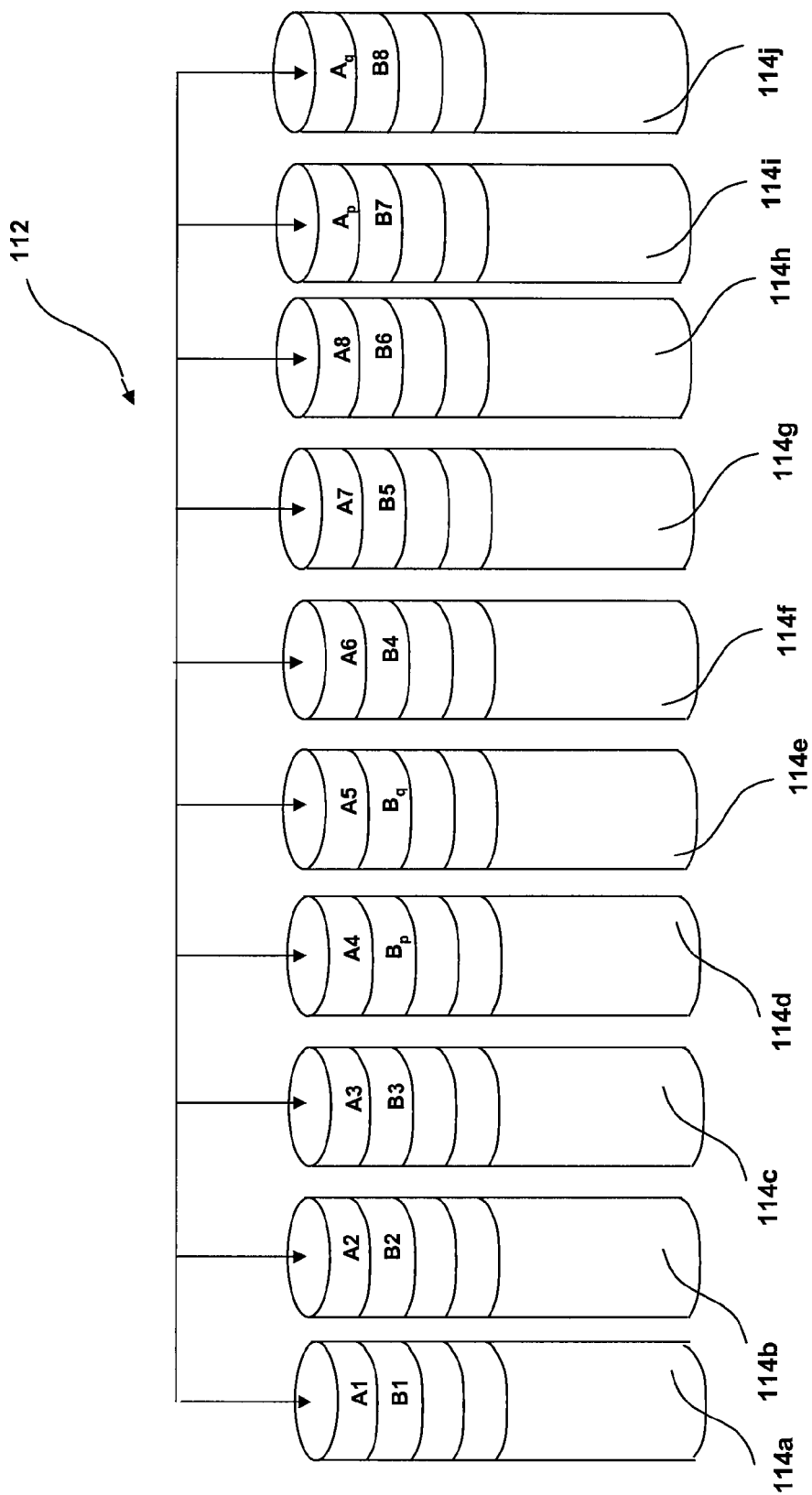
FIG. 3 is a schematic diagram of the mapping between storage sector indices in a RAID 6 arrangement.

The format of the storage devices 114 will now be described with reference to FIG. 3. FIG. 3 illustrates an example of a RAID 6 array. However, other arrangements may be used with the present invention, for example, RAID 5, RAID 10 or RAID 50.

As shown in FIG. 3, data is stored on the RAID 6 array in the form of stripe units (also known as RAID chunks). Each data stripe A, B comprises ten separate stripe units distributed across the storage devices—stripe A comprises stripes A1-A8 and parity stripe units $A_p$ and $A_q$. Stripe B comprises stripe units B1 to B8 and parity stripe unit $B_p$ and $B_q$. Therefore, the stripe units comprising each stripe (A1-A8 or B1-B8 respectively) are distributed across a plurality of disk drives, together with parity information $A_p$, $A_q$, $B_p$ and $B_q$ respectively. This provides data redundancy.

The size of a stripe unit can be selected based upon a number of criteria, depending upon the demands placed upon the RAID array, e.g. workload patterns or application specific criteria. Common stripe unit sizes generally range from 16K up to 256K. In this example, 128K stripe units are used. The size of each stripe A, B is then determined by the size of each stripe unit in the stripe multiplied by the number of non-parity data storage devices in the array (which, in this example, is eight). In this case, if 128K stripe units are used, each RAID stripe would comprise 8 data stripe units (plus 2 parity stripe units) and each RAID stripe A, B would be 1 MB wide.

However, the stripe size is not material to the present invention and the present example is given as a possible implementation only. Alternative arrangements may be used. Any number of drives or stripe unit sizes may be used.

Storage on a storage device 114*a-j* comprises a plurality of sectors (also known as logical blocks). A sector is the smallest unit of storage on the storage device 114*a-j*. A stripe unit will typically comprise a plurality of sectors.

Figure 4:
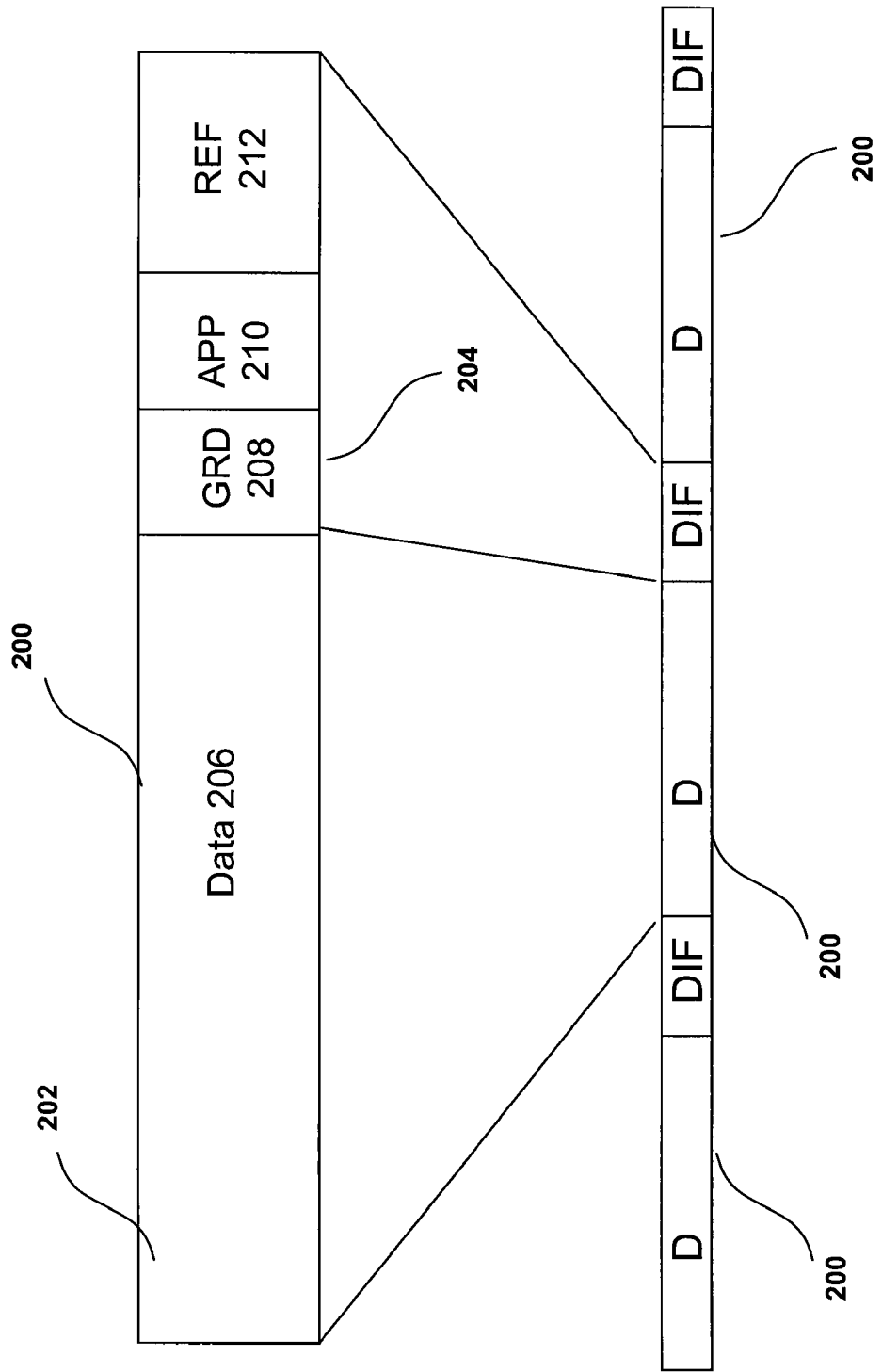
FIG. 4 is a schematic diagram of a sector amongst a plurality of sectors in a storage device.

FIG. 4 shows the format of a sector 200 of a storage device 114*a*. The sector 200 comprises a data field 202 and a data integrity field 204. Depending upon the file system used, each sector 200 may correspond to a logical block.

As set out above, the term "storage device" in the context of the following description may refer to a logical drive which is formed on the RAID array. In this case, a sector refers to a portion of the logical drive created on the RAID array. The following embodiment of the present invention is applicable to any of the above described arrangements.

The term "sector" used herein, whilst described in an embodiment with particular reference to 520 byte sector sizes as specified by the T10 protocol, is generally applicable to any sector sizes within the scope of the present invention. For example, some modern storage devices comprise 4 KB data sectors and a 64 byte data integrity field. Therefore, the term "sector" is merely intended to indicate a portion of the storage availability on a storage device within the defined storage protocols and is not intended to be limited to any of the disclosed examples. Additionally, sector may be used to refer to a portion of a logical drive, i.e. a virtual drive created from a plurality of physical hard drives linked together in a RAID configuration.

In this embodiment, the storage device 114 is formatted such that each sector 200 comprises 520 bytes (4160 bits) in accordance with the American National Standards Institute's (ANSI) T10-DIF (Data Integrity Field) specification format. The T10-DIF format specifies data to be written in blocks or sectors of 520 bytes. The 8 additional bytes in the data integrity field provide additional protection information (PI), some of which comprises a checksum that is stored on the storage device together with the data. The data integrity field is checked on every read and/or write of each sector. This enables detection and identification of data corruption or errors.

As set out above, the data field 202, in this embodiment, is 512 bytes (4096 bits) long and the data integrity field 204 is 8 bytes (64 bits) long. The data field 202 comprises user data 206 to be stored on the storage device 106*a-j*. This data may take any suitable form and, as described with reference to FIGS. 2 and 3, may be divided into a plurality of stripe units spread across a plurality of storage devices 106*a-j*. However, for clarity, the following description will focus on the data stored on a single storage device 106.

In a T10-based storage device, the data integrity field 204 comprises a guard (GRD) field 208, an application (APP) field 210 and a reference (REF) field 212. The GRD field 208 comprises 16 bits of ECC, CRC or parity data for verification by the T10-configured hardware. In other words, sector checksums are included in the GRD field in accordance with the T10 standard. The format of the guard tag between initiator and target is specified as a CRC using a well-defined polynomial. The guard tag type is required to be a per-request property, not a global setting.

The APP field 210 comprises 16 bits reserved for application specific data. In practice, this field is rarely used.

The REF field 212 comprises 32 bits of location information that enables the T10 hardware to prevent misdirected writes. In other words, the physical identity for the address of each sector is included in the REF field of that sector in accordance with the T10 standard.

The checksums in the GRD field 208 and REF field 212 are processed by the T10 compliant HBA 120. These CRC calculations are relatively processor-intensive, so by performing these tasks in specialist T10 hardware (the HBA 120), the central processing units (CPUs) of the server 104 are freed from the task of checksum calculation and processing.

Since, in general, the number of hosts 102 will be significantly greater than the number of servers, in conventional Lustre file systems the server computational resources are the limiting factor is calculating and verifying data checksums.

Therefore, an aspect of the present invention is that the client-side application or OS is required to calculate the necessary GRD checksums under the T10 protocol. These checksums can then be analysed by the specialist T10 hardware in the HBA 120 on the server 104. This frees the server CPUs from having to perform these calculations.

Figure 5:
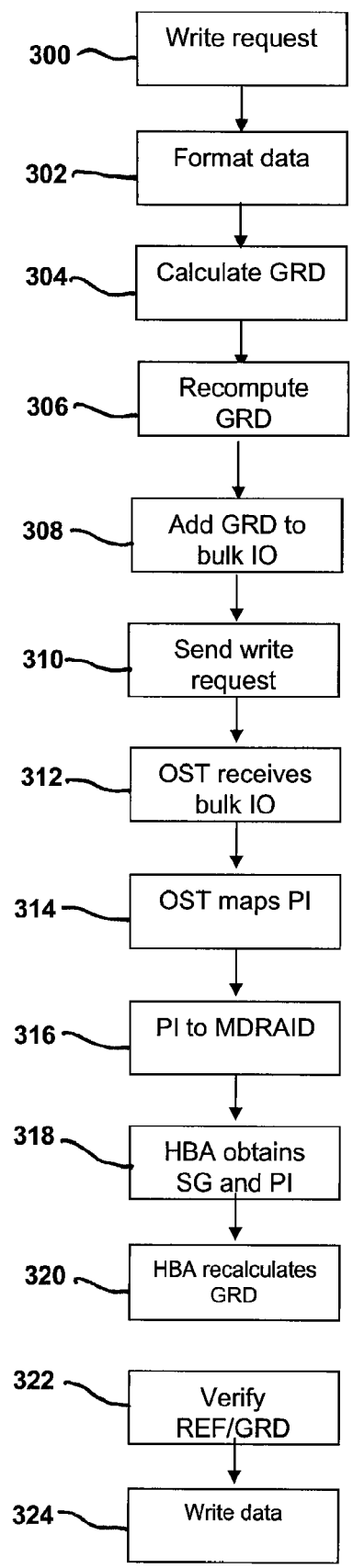
FIG. 5 is a flow diagram showing a write operation according to an embodiment of the present invention.
Figure 6:
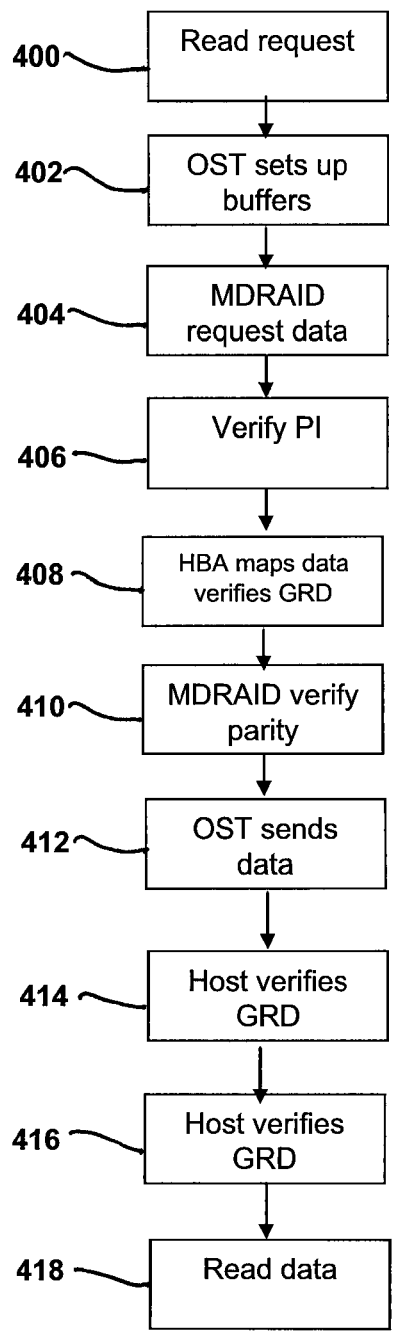
FIG. 6 is a flow diagram showing a read operation according to an embodiment of the present invention.
Figure 7:
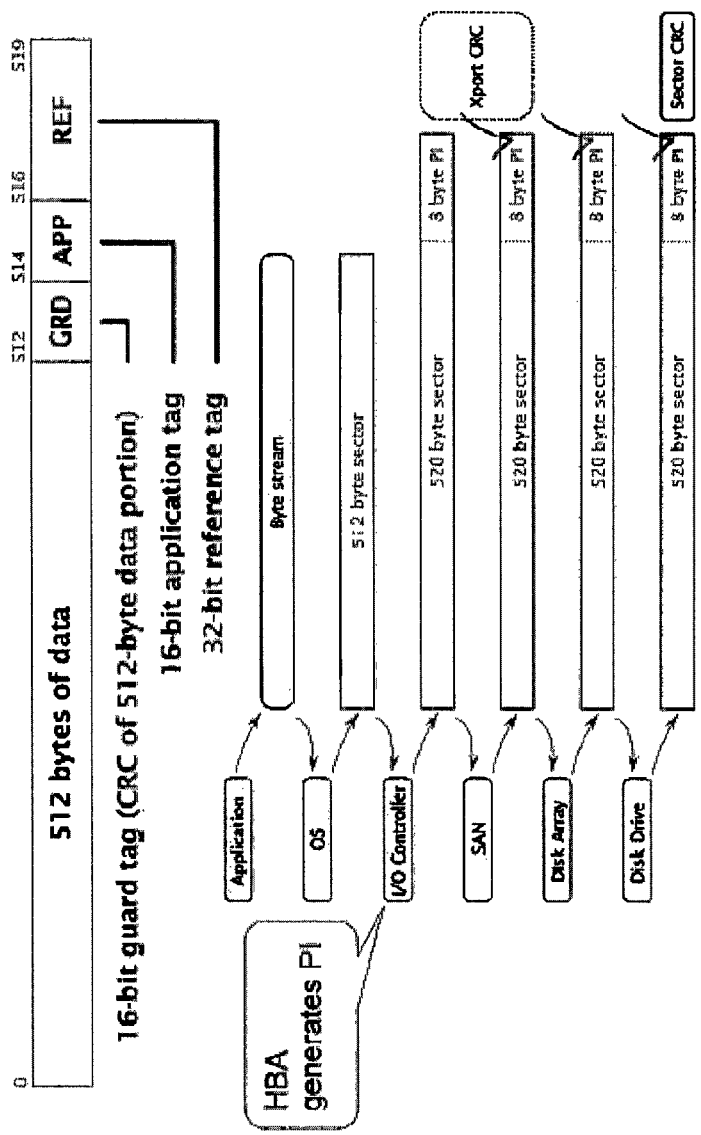
FIG. 7 is a known arrangement for processing T10-DIF storage requests.
Figure 8:
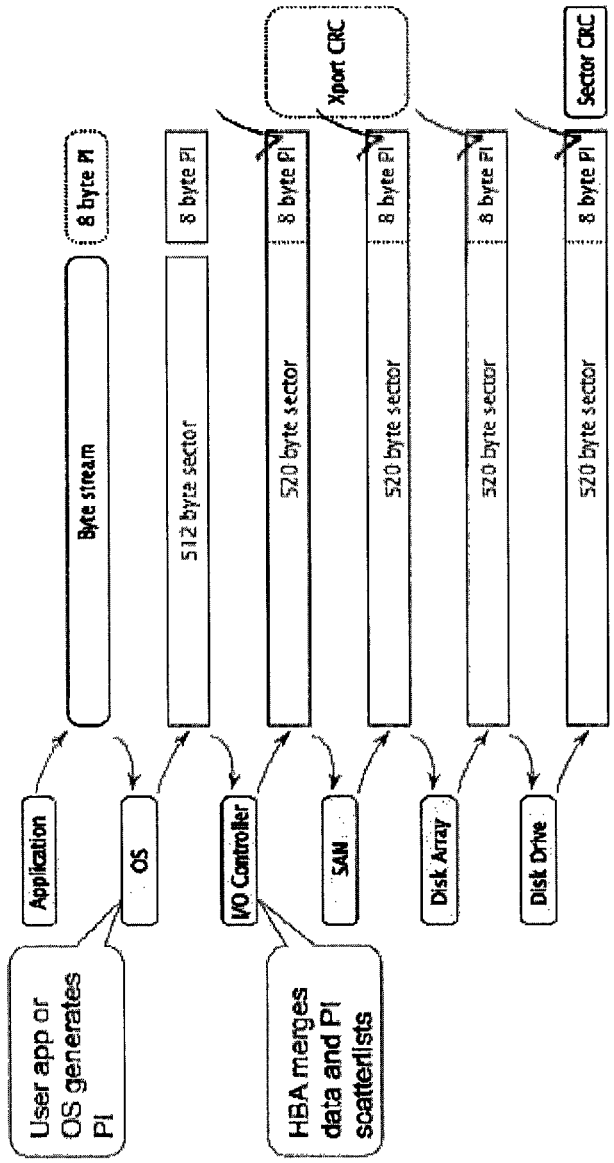
FIG. 8 is a known arrangement for processing T10-DIX storage requests.

The operation of a T10-DIF/DIX compliant distributed network system will now be described with reference to FIGS. 5 and 6. FIG. 5 shows a flow diagram of the method for writing data to the OST 112 with end to end data integrity. FIG. 6 shows a flow diagram of the method for reading data from the OST 112.

The steps of writing data to the OST 112 will be discussed with reference to FIG. 6.

Step 300: Write Request

At step 300, a client application running on host 102 generates a write request for a specific volume (e.g. OST 112) to which it has been assigned access rights. A byte stream is generated.

Step 302: Format Data into Sectors

At step 302, the byte stream is formatted by a host-side operating system (OS) into 512 byte data sectors. The method proceeds to step 304.

Step 304: Calculate GRD

The client application computes the GRD checksum 208 for each sector. This is in the form of a CRC checksum and is done utilising client-side processor resources.

Alternatively, the GRD checksum 208 could be calculated by the client-side OS. The method proceeds to step 306.

Step 306: Recompute GRD

At step 306, the GRD for each sector is recomputed by the client-side application or OS after a kernel copy has been made. The recalculated GRD values are then saved in a private page area.

Note that this step is optional and costs additional client-side processor resources. However, inclusion of this step enables identification of the source of a corruption. Therefore, it may be useful to include this step in high-risk systems.

The method proceeds to step 308.

Step 308: Add GRD to bulk IO descriptor

At step 308, the calculated GRD information generated in steps 304 and/or 306 is then added into a bulk I/O descriptor. In other words, the generated GRD PI is placed in a separate bulk I/O buffer which is 1/64 of the total data size and a descriptor is added to the outbound RPC.

Step 310: Send Write Request

The request is sent via communication network 112 to the host ports (not shown) of the server 104. The write command is then stored in a local cache (not shown) forming part of the HBA 120 of the server 104. The write request is sent in the format of a standard Lustre RPC (1 MB)

The method proceeds to step 312.

Step 312: OST Receives Bulk I/O

At step 312, the OSS 104 receives the write request in the form of a bulk I/O. At this stage, there is no need for the OSS 104 to recompute the GRD values prior to replying to the request from the host 102 as would be required with conventional arrangements. This reduces the load on the server CPUs.

In general, the OSS 104 delays a reply to the host until the write returns successfully from the disk I/O subsystem. This is in case an error is detected.

The method then proceeds to step 314.

Step 314: OST Maps PI

At step 314, the OST 112 maps the PI for each sector received in the write request. Whilst the above steps have only referred to the GRD field 208, all 8 bits of PI under the T10 protocol are required to be transferred between the host 102 and the OST 112 otherwise memory copies would be required to interleave the data.

The method proceeds to step 316.

Step 316: OST Passes PI to MDRAID Layer

Once the PI for each sector has been mapped in step 314, it is passed to the MD RAID layer. At this point, the MDRAID layer maps the REF field 212 of each sector and calculates any required RAID parity.

The method proceeds to step 318.

Step 318: HBA Obtains SG and PI

At step 318, the HBA 120 obtains the scatter gather (SG) lists of data and corresponding protection information. The HBA 120 requires dual SG lists for data and PI to achieve this.

Step 320: HBA Recalculates GRD

At step 320, the HBA 120 recalculates the GRD sector checksums. Since this is done using specialist T10-compliant hardware (in this example, the HBA 120), the computational demands on the server processors is minimal.

The GRD is also checked at this point. If the GRD is verified as accurate, the method proceeds directly to step 322. However, if an error is returned, this is reported to the last GRD recompute step. This may be step 304 or 306 on the client side. These steps are then repeated until the error is corrected.

Step 322: Storage Device Verifies REF and GRD

At step 322, the data is written to the storage device 114 (via the RAID controller 124). At this point, the REF and GRD fields 208, 210 are checked and verified. If they are verified as correct, the data is written in step 324. If an error is detected, the method returns to step 320.

Step 324: Write Data to Storage Sector

At step 324, the data has been verified from client application through to storage device (disk) level and the data is written to an intended sector.

FIG. 6 shows a flow diagram of the method for reading data from the OST 112.

Step 400: Read Request

At step 400, a client application running on host 102 generates a read request for a specific volume (e.g. OST 112) to which it has been assigned access rights. At this point, the host 102 sets up data and PI buffers and then a bulk I/O request is sent.

The method proceeds to step 402.

Step 402: OST Sets Up Buffers

Once the read request generated in step 400 is received by the OST 104, corresponding data and PI buffers are generated thereon.

The method proceeds to step 404.

Step 404: MDRAID Requests Data and Parity Blocks

At step 404, the MDRAID layer requests from the OST 112 the required data and associated parity blocks.

The method proceeds to step 406.

Step 406: Verify PI

In step 406, the storage device 114 verifies the GRD and REF fields of the requested data sectors. The data, once verified, is then sent to the HBA 120.

The method proceeds to step 408.

Step 408: HBA Maps Data and Verifies GRD

At step 408 the HBA 120 maps the data and PI to respective buffers and verifies the GRD field 208 of the PI.

The method proceeds to step 410.

Step 410: MDRAID Verifies Parity

At step 410, the parity of the retrieved data sectors is verified. If an error is detected, the data is reconstructed. If necessary, once the data has been reconstructed, the method proceeds to step 412.

Step 412: OST Sends Data

At step 412, the now-verified data is sent to the host 102. The method proceeds to step 414.

Step 414: Host Verifies GRD

At step 414, the kernel on the host 102 verifies the GRD field 208 of the received data. The method proceeds to step 416.

Step 416: Host Verifies GRD

As an optional step, the client application and/or OS on the host 102 may also verify the GRD data 208. The method proceeds to step 418.

Step 418: Read Data

The data has now been received successfully by the host 102 and can be utilised as required.

Variations of the above embodiments will be apparent to the skilled person. The precise configuration of hardware and software components may differ and still fall within the scope of the present invention.

For example, the present invention has been described with reference to controllers in hardware. However, the controllers and/or the invention may be implemented in software. This can be done with a dedicated core in a multi-core system.

Whilst the above examples have been illustrated with respect to T10-capable hardware such as a T10 DIF or T10 DIX compliant HBA, other arrangements are possible. For example, T10-capable hardware such as T10-compliant hard drives may be used.

Additionally, whilst the present embodiment relates to arrangements operating predominantly in off-host firmware or software, an on-host arrangement could be used.

Further, alternative ECC methods could be used. The skilled person would be readily aware of variations which fall within the scope of the appended claims.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of writing data to a distributed file system comprising at least one client, at least one server and at least one storage resource target, the method comprising:

generating, on the client, a write request comprising a byte stream to be written to the storage resource target;

formatting, on the client, the byte stream into a sequence of fixed-length sectors in accordance with a T10 based protocol, the sectors each comprising a data field comprising data and a protection information field comprising protection information including a guard field, an application field and a reference field;

computing, on the client, checksum data for the guard field of each sector on a per-sector basis and storing the checksum data in a client kernel;

sending, across a network, the data from the data field of each sector and the protection information from the protection information field of each sector to the server, the protection information including the checksum data for each sector calculated on a per-sector basis and stored in the client kernel;

verifying the data sent across the network between the client and the server by generating, for each sector, a first recalculated set of the checksum data for the guard field of each sector in T10 capable hardware on the server such that no checksum calculations are performed on a CPU of the server and using the T10 capable hardware to compare the first recalculated set of the checksum data to the checksum data sent across the network from the client;

transferring, from the server to the storage resource target, the data from the data field of each sector and the protection information from the protection information field of each sector previously sent across the network to the server responsive to the first recalculated set of the checksum data matching the checksum data sent across the network from the client;

verifying, on the storage resource target, the checksum data for the guard field of each sector by generating, for each sector, a second recalculated set of the checksum data for the guard field of each sector and comparing the second recalculated set of the checksum data to the checksum data sent from the server to the storage resource target; and storing the data from the data field of each sector on the storage resource target responsive to the second recalculated set of the checksum data matching the checksum data sent from the server to the storage resource target.

2. The method of claim 1, wherein the formatting step comprises using the client to format the byte stream into sectors comprising 512 bytes of data and 8 bytes of protection information.

3. The method of claim 2, further comprising:

formatting, for each sector, the data from the data field and the protection information from the protection information field into a remote procedure call (RPC) format.

4. The method of claim 3, wherein the RPC format utilizes an RPC buffer.

5. The method of claim 1, wherein the T10 capable hardware comprises a T10-DIF or T10-DIX compliant host bus adapter.

6. The method of claim 1, wherein the client is configured to utilize a Lustre based parallel distributed file system.

7. The method of claim 1, further comprising subsequently returning the data previously stored on the storage resource target to the client responsive to a read command issued by the client, by steps comprising:

transferring, from the storage resource target, the data from the data field of each sector and the protection information from the protection information field of each sector to the server;

verifying, on the server using the T10 capable hardware, the checksum data for the guard field of each sector by generating, for each sector, a third recalculated set of the checksum data for the guard field of each sector and comparing the third recalculated set of the checksum data to the checksum data sent from the storage resource target to the server;

transferring, from the server to the client across the network, the data from the data field of each sector and the protection information from the protection information field of each sector previously transferred from the storage resource target to the server responsive to the third recalculated set of the checksum data matching the checksum data transferred from the storage resource target;

retrieving, by the client, the checksum data stored in the client kernel; and comparing, for each sector, the checksum data retrieved from the client kernel to the checksum data transferred from the server to the client across the network.

8. A method of reading data from a distributed file system comprising at least one client, at least one server and at least one storage resource target, the method comprising:

executing, from the client, a read request for reading of data from at least one data sector of a sequence of fixed-length data sectors, each data sector comprising a data field and a protection information field, the protection information field comprising protection information including a guard field, checksum data stored in the guard field, an application field and a reference field;

transferring, from the storage resource target, the data from the data field of each sector and the protection information from the protection information field of each sector to the server;

verifying, on the server using T10 capable hardware, the checksum data for the guard field of each sector by generating, for each sector, a first recalculated set of the checksum data for the guard field of each sector and comparing the first recalculated set of the checksum data to the checksum data sent from the storage resource target to the server;

transferring, from the server to the client across the network, the data from the data field of each sector and the protection information from the protection information field of each sector previously transferred from the storage resource target to the server responsive to the first recalculated set of the checksum data matching the checksum data transferred from the storage resource target;

retrieving, by the client, previously stored checksum data in a client kernel; and comparing, for each sector, the checksum data retrieved from the client kernel to the checksum data transferred from the server to the client across the network.

9. The method of claim 8, further comprising formatting the byte stream into sectors comprising 512 bytes of data and 8 bytes of protection information in accordance with a T10-DIF and/or T10-DIX protocol.

10. The method of claim 9 further comprising:

sending the data and protection information in a remote procedure call (RPC) format.

11. The method of claim 10, wherein the RPC format utilizes an RPC buffer of 1 Megabyte (MB) in size.

12. The method of claim 8, wherein the T10 capable hardware of the server comprises a host bus adapter.

13. An apparatus comprising:

a client device of a distributed file system configured to generate a write request comprising a byte stream formatted into a sequence of fixed-length sectors in accordance with a storage system interface, the sectors each comprising a data field comprising data and a protection information field comprising protection information including a guard field, an application field and a reference field, the client device further configured to generate checksum data for the guard field for each sector on a per-sector basis;

a server device coupled to the client device across a network, the client device further configured to send, across the network, the data from the data field of each sector and the protection information from the protection information field of each sector to the server, the protection information including the checksum data for each sector generated on a per-sector basis, the server configured to generate, via storage system interface capable hardware of the server, a first recalculated set of the checksum data and to compare the first recalculated set of the checksum data to the checksum data received from the client; and a storage resource target coupled to the server, the server further configured to transfer to the storage resource target the data from the data field of each sector and the protection information from the protection information field of each sector previously sent across the network to the server responsive to the first recalculated set of the checksum data matching the checksum data sent across the network from the client, the storage resource target configured to generate, for each sector, a second recalculated set of the checksum data for the guard field of each sector, to compare the second recalculated set of the checksum data to the checksum data sent from the server to the storage resource target, and to store the data from the data field of each sector on the storage resource target responsive to the second recalculated set of the checksum data matching the checksum data sent from the server to the storage resource target.

14. The apparatus of claim 13, wherein the client formats the byte stream into sectors each comprising 512 bytes of data and 8 bytes of protection information.

15. The apparatus of claim 14, wherein the client further formats the sectors into a remote procedure call (RPC) format of selected size.

16. The apparatus of claim 15, wherein the selected size comprises 1 MB.

17. The apparatus of claim 13, wherein the storage system interface capable hardware comprises a T10-DIF or T10-DIX compliant host bus adapter which operates independently of a server processor to generate the first reconstructed set of the checksum data.

18. The apparatus of claim 13, wherein the client is configured to utilize parallel distributed file system.

19. The apparatus of claim 13, wherein the client is further configured to store the checksum data generated for the guard field for each sector on a per-sector basis in a local client kernel.

20. The apparatus of claim 19, wherein the client is further configured to issue a read command to subsequently retrieve the data previously stored by the storage resource target, and responsive to the read command:

the storage resource target is further configured to transfer to the server the data from the data field of each sector and the protection information from the protection information field of each sector to the server;

the server is further configured to use the storage system interface capable hardware to generate a third recalculated set of the checksum data for the guard field of each sector, to compare the third recalculated set of the checksum data to the checksum data sent from the storage resource target to the server, and to transfer across the network to the client the data from the data field of each sector and the protection information from the protection information field of each sector previously transferred from the storage resource target to the server responsive to the third recalculated set of the checksum data matching the checksum data transferred from the storage resource target; and the client is further configured to retrieve the checksum data stored in the client kernel and to compare, for each sector, the checksum data retrieved from the client kernel to the checksum data transferred from the server to the client across the network.

* * * * *